United States Patent [19]
Chiodo

[11] Patent Number: 4,885,945
[45] Date of Patent: Dec. 12, 1989

[54] MICROPIPETTES AND FABRICATION THEREOF

[75] Inventor: Chris Chiodo, Warren, Mich.

[73] Assignee: Activational Systems, Inc., Warren, Mich.

[21] Appl. No.: 300,816

[22] Filed: Jan. 23, 1989

Related U.S. Application Data

[63] Continuation-in-part of Ser. No. 159,197, Feb. 23, 1988, abandoned.

[51] Int. Cl.$^4$ .................... C03B 23/207; C03B 23/11
[52] U.S. Cl. .................... 73/863.32; 65/54; 65/56; 65/57; 65/152; 65/270; 73/864.01
[58] Field of Search .................. 65/36, 54, 55, 56, 57, 65/152, 270; 73/863.32, 864.01

[56] References Cited

U.S. PATENT DOCUMENTS

3,095,191  6/1963  Freyne ............................. 65/65 UX

OTHER PUBLICATIONS

"Multibarrel Micropipettes" 10-1-80. Advertisement by Medical Systems Corp. submitted by applicant.

Price Sheet of R&D Optical Systems, Inc. Spencerville, Md.-dated 1977, (submitted by applicant).
"Microelectrophoresis", Chap. 4, by David R. Curtis, pp. 144-190 (cited by applicant).

*Primary Examiner*—Arthur Kellogg
*Attorney, Agent, or Firm*—George L. Boller

[57] ABSTRACT

A novel method for fabricating glass micropipettes comprises assembling glass tubes side-by-side in a bundle, softening an axially central region of the bundle by heating, axially elongating the softened central region to create two opposing tapers, and then dividing the bundle in two at the axial midpoint of the central region to thereby create two micropipettes. The distal tip end of each micropipette at which it was separated from the other is then relatively advanced toward a hot flame to create a spherical enlargement at the tip end. This spherical enlargement facilitates subsequent gripping of this end when the micropipette is subsequently finished to produce desired orifice sizes for the barrels at the distal tip end. It is also desirable to perform a twisting step after the softening step and before the elongating step.

28 Claims, 2 Drawing Sheets

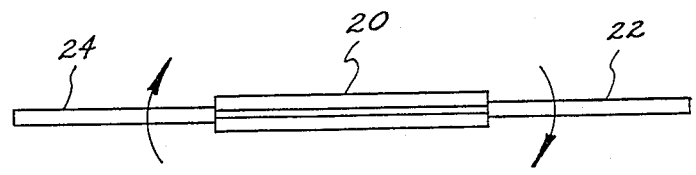
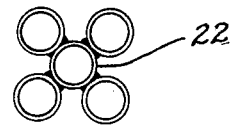
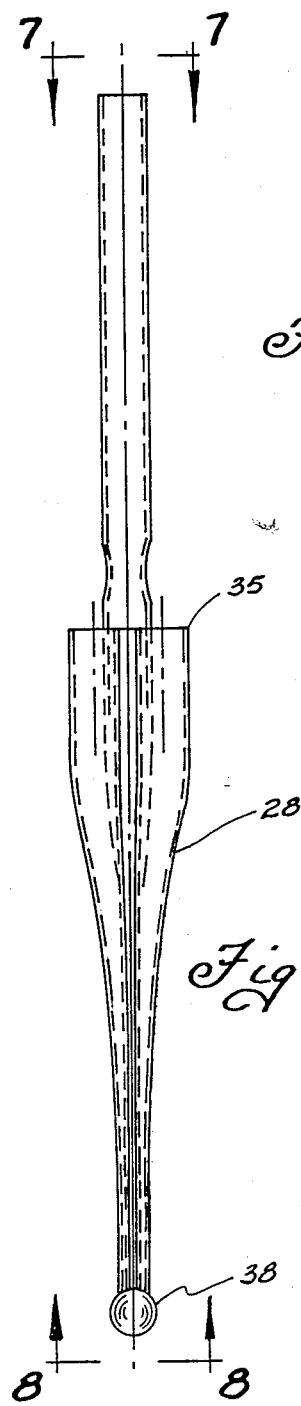
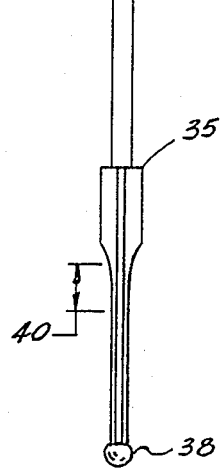
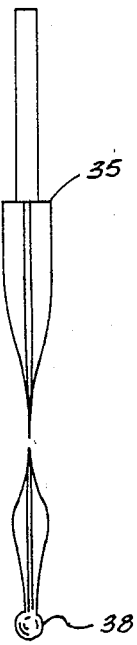

MICROPIPETTES AND FABRICATION THEREOF

REFERENCE TO A RELATED APPLICATION

This application is a continuation-in-part of my prior co-pending application Ser. No. 07/159,197 filed Feb. 23, 1988 now abandoned.

BACKGROUND AND SUMMARY OF THE INVENTION

This invention relates generally to pipettes and the fabrication thereof. More specifically, it relates both to a novel method for the manufacture of multi-barrel glass micropipettes and to the micropipettes themselves.

One of the major uses of multi-barrel glass micropipettes is in research testing procedures where it is necessary to test the response of living matter, such as cells, or tissue, to certain chemical stimuli. A detailed illustration of this type of procedure is presented in *Microelectrophoresis*, Chapter 4, by David R. Curtis, and a copy of that chapter is being submitted with the accompanying Prior Art Statement. Basically, fluids containing different substances are loaded into the different barrels of the micropipette. The micropipette is then used to dispense minute amounts of the fluid-carried substances with suitable accuracy and efficiency so as to enable many different substances to be expeditiously tested on many different types of living matter, as desired.

The micropipette apparatus that is described by Curtis in the above reference comprises a multi-barrel glass micropipette that comprises a number of individual glass tubes that are bundled together side-by-side and tapered to a dispensing tip at the distal end of the micropipette. Each tube oonstitutes an individual barrel that is loaded with a particular fluid-carried substance via the end that is opposite the tip. The configuration of a straight central tube around which the remaining tubes are circumferentially arranged, is convenient both for dispensing substance-containing fluids from the micropipette, and for loading the fluids into the barrels, especially where the inlet ends of the surrounding tubes are canted outwardly, as shown in the Curtis Article.

However, the manner of fabricating the micropipettes of the Curtis article is relatively time-consuming, involving considerable amounts of hand labor. Hence, this contributes to the cost of producing a micropipette. For example, the individual tubes of a bundle are cut to length from straight tubes, they are formed as required to create the basic desired shape for each, they are bundled side-by-side along their distal end portions and finally the bundled distal end portions are softened by heating and then drawn to a taper. Upon cooling, the distal end portion of the micropipette is broken off and discarded as scrap yielding a single multi-barrel micropipette in which each individual tube has its own very tiny dispensing orifice at the distalmost end of the micropipette. Curtis comments on the difficulty of breaking off the distal end portion (bumping the tip) to produce a desired minute orifice size.

It has become a practice in the industry for the micropipettes to be fabricated as "blanks" which are shipped from the manufacturer to the customer. The blanks have the basic micropipette shape, as described, but the distal ends have not been "finished" to yield the desired dispensing orifice sizes. The customer has equipment to perform the finishing by re-drawing the tapered tip so that it will conform to the customer's particular needs.

Since such finishing involves heating and axially elongating the distal end portion of the mioropipette, it is necessary for axial elongating forces to be applied to the micropipette. The customer has apparatus for performing the finishing, typically a machine that has a pair of axially aligned chucks that face each other. The axial ends of the micropipette are grabbed by the respective chucks, and when the distal end portion of the micropipette has been suitably softened, the chucks are moved relatively away from each other to perform the re-drawing.

One of the difficulties in performing such a finishing procedure involves grabbing the necked-down distal end portion by the corresponding chuck. Too much radial force may break the glass, yet an insufficient force will not satisfactorily hold the glass. Because it comes to a tip, the distal end is difficult to grab, and therefore, additional prepping of the tip is virtually mandatory. For example, shrink tubing is often inserted over the tip forming a sleeve that grips the tip for pulling. Nonetheless, such a procedure still results in a significant amount of breakage.

It is known to provide what are called "prepulled" blanks" in which the necked-down taper is created in the middle of the bundled tubes. An example of such a blank is shown in the publication entitled "Multibarrel Micropipettes" referred to in the accompanying Prior Art Statement. The distal end of the bundle is the same diameter as that lying to the axially opposite side of the taper, and both distal and proximal ends of the bundle contain ferrules, or metal rings, secured to the glass via which the blank is chucked for re-drawing. While a prepulled blank of this form may provide lesser difficulty in re-drawing of the taper, it is wasteful of material because a large mass of glass is broken off and discarded as scrap after the re-draw, and only one micropipette is produced. Hence, there is a need for improvement upon the procedures that have been described, and such improvement is offered by the present invention.

The present invention, in one principal aspect, relates to a novel method for manufacturing a multi-barrel micropipette with improved efficiency. Basically, the method is effective to create two micropipettes from an individual manufacturing operation. The resulting product can be produced at a lower cost than the micropipette that is described in the Curtis article and this benefit can ultimately be passed on to the consumer. While the invention still involves steps of assembling glass tubes together and drawing tapers, it does so in a novel and unique way.

Moreover, according to another principal aspect of the invention, a new step is added to the procedure of fabricating a micropipette which comprises creating a bulbous shape at the distal end of the dispensing tip. This enlarged bulbous shape facilitates the handling and usage of the micropipette by the customer, especially for customer finishing of the tipped end.

The foregoing features, advantages and benefits of the invention, along with additional ones, will be seen in the ensuing description and claims which should be considered in conjunction with the accompanying drawings. The drawings disclose a presently preferred embodiment of the invention in accordance with the best mode contemplated at the present time in carrying out the invention.

BRIEF DESCRIPTIONS OF THE DRAWINGS

FIG. 6 is an enlarged axial view of a micropipette fabricated by the steps of FIGS. 1–5.

FIG. 7 is a transverse end view taken in the direction of arrows 7—7 in FIG. 6.

FIG. 8 is a transverse end view taken in the direction of arrows 8—8 in FIG. 6.

FIGS. 9 and 10 illustrate additional steps for re-drawing, or finishing, the tip end of the micropipette of FIG. 6.

FIG. 11 shows an additional step that can be performed between the steps of FIGS. 2 and 3.

DESCRIPTION OF THE PREFERRED EMBODIMENT

Figure 1:
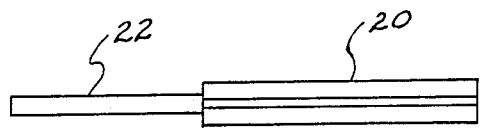
FIGS. 1 through 5 illustrate a sequence of steps in a method of fabricating a micropipette according to the present invention.

The method and resulting micropipette that are to be described with reference to the drawing figures are for a five tube configuration comprising a centrally disposed tube and four surrounding tubes. It is to be understood that this specific example is representative of principles of the invention.

The illustrated example utilizes 3.0 milimeter, 0.6 mm wall, "Pyrex" tubing. The drawing figures are shown to be approximately proportioned in accordance with actual proportions, but it is to be appreciated that there can be variations in the proportions that will result from variations in tube length and tube diameter.

The fact that this description comprises a statement of a sequence of fabrication steps should not necessarily be construed as implying that those steps must always be followed in that sequence in order to practice the inventive principles. Obviously, certain steps will have to be subsequent to others but for some steps, the sequence is not important.

The starting point in the fabrication sequence is illustrated in FIG. 1 where a bundle 20 of five individual tubes of equal diameter and equal length are bundled together so that one of the five tubes forms the central tube and the remaining four tubes are disposed equi-distant around the outside of the central tube. The outer tubes are approximately tangent to the central tube at 90° spacings around the central tube and joining is accomplished along these points of tangency by appropriate processing procedures such as heating the tubes slightly to soften them. Advantageously, however such a bundle oan be cut from lengths of bundled tubing that is commercially purchased directly from the glass tube manufacturer.

Two additional tubes 22, 24 are then assembled to the bundle; specifically they are joined to the opposite ends of the central tube of the five tube bundle.

Figure 2:
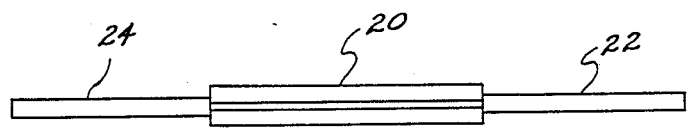

According to the method that is illustrated in the drawings, tube 22 and bundle 20 are chucked in the respective chucks of a lathe (not shown in the drawings); the confronting ends of the tube and bundling are brought together while they are being heated and rotated; this causes tube 22 to join the central tube in bundle 20 (FIG. 1). Then the bundle and tube assembly is rechucked so that the second additional tube 24 can be attached to the other end of the central tube of bundle 20 in like manner (FIG. 2). After the two additional tubes have been joined to the central tube of the five tube central barrel, it is desirable to flame polish the ends of the four outer tubes. The assembly shown in FIG. 2 is now ready to be drawn.

Figure 3:
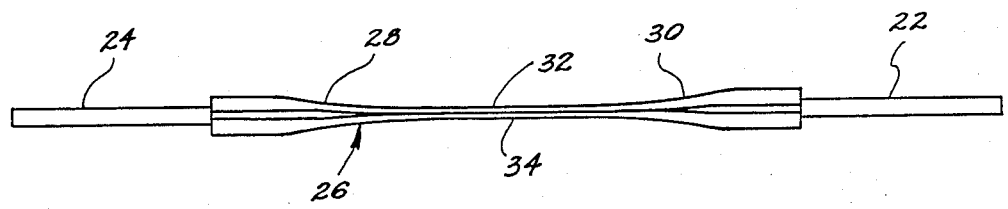
Figure 4:
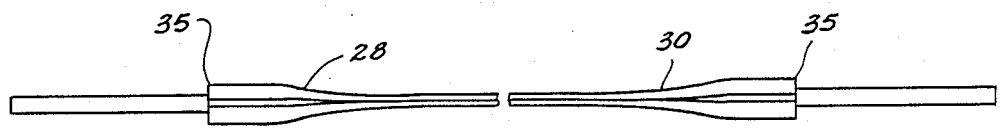

FIG. 3 illustrates the drawing step. The drawing is conducted by softening the axially central region of the central five tube barrel. In its softened state, the application of pulling forces to the ends of the assembly will produce a necked-down region 26 comprising a pair of tapers 28, 30, and between the tapers, a central region 32 that is of reduced diameter. Through properly controlled heating of the central region of the bundle that is to be softened, and also by careful pulling, the resulting shape can be quite symmetrical about an axial midpoint 34. It is at this axial midpoint that a severing operation by flame cutting takes place with the result that the one piece assembly shown in FIG. 3 is now divided into two as shown in FIG. 4.

Figure 5:
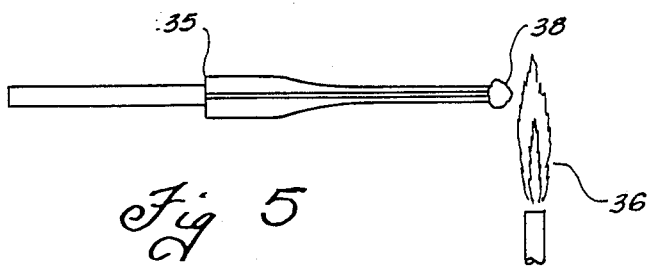

The result is that two individual micropipettes 35 are produced, each of which contains a taper that reduces from the starting diameter of the bundle to a much smaller diameter at the distal end. Each of the two individual mioropipettes is next further processed by relatively advancing the distal tipped end toward a hot flame 36, preferably while the tip is being rotated (FIG. 5). The action of advancing the flame into the rotating distal end of the micropipette results in the creation of a bulbous shape 38, particularly a generally spherical shape, as shown in FIG. 6. It has been found that the shape is created simply by the action of relatively advancing of the flame into the rotating tip, and no additional shaping procedures are necessarily required to yield this shape. The creation of this enlarged spherically tipped end makes the micropipette more convenient for handling and use by the customer, particularly for finishing the tip to desired size.

In the example using 3 mm tubing, the tip can be drawn to a diameter of about 1.5 to 1.8 mm immediately proximal the spherical end 38, and a 2.5 mm diameter for the spherical end 38 can be conveniently produced. The radius of the spherical end 38 will therefore be less than twice that of the immediately proximal portion of the tip; it will also be at least about five times smaller than the immediately proximal portion of the bundle lying to the other side of the taper.

FIGS. 9 and 10 portray steps in the finishing procedure on the micropipette of FIG. 8 to produce the desired minute tip sizes at the distal dispensing end of the micropipette. This, and the subsequent "bumping" of the tip, are typically performed by the customer.

The proximal end of the micropipette, which comprises the extended central tube, and the distal end, which comprises the spherically shaped tip, are grabbed by suitable chucks (not shown); the approximate region of the tip shown by the numeral 40 in FIG. 9 is softened, as by heating, and the chucks are relatively moved away to thereby re-draw the tip. Preferably the chucks are rotated in unison during the heating and re-drawing. After a certain amount of re-draw, the distal end portion that contains the tip separates, typically in the manner shown by FIG. 10. The residual distal end of the micropipette possesses a sharp needle-like shape that, after cooling, is ready for "bumping" by the user.

The spherically contoured tip provides a radial enlargement forming a shoulder that greatly facilitates gripping of the tip end during the re-drawing of this end for finishing the micropipette.

It can therefore be seen that the procedures that have been described are effective to produce two micropipettes in one basic manufacturing operation and that no scrap is generated at this time. The bulbous tipped end is produced by a subsequent single operation on each micropipette; it facilitates the subsequent finishing of the tip to a desired size by making the tip much more convenient for grasping for re-drawing. Minimal scrap is generated at this time because only the bulbous end is separated and discarded after finishing. An improved process and product have therefore been disclosed.

Use of the micropipette for microelectrophoresis comprises filling of the barrels with electrode wires (not shown); use of glass tube that has a small straight axial rib along its inner wall ("Omega-Dot" tubing) may also be desirable to facilitate the dispensation of a barrel's contents through the extremely fine opening in the tip end that is created by "bumping".

FIG. 11 portrays an additional step that may be added to the sequence of steps shown in FIGS. 1–5. Specifically, the step of FIG. 11 is added between the steps of FIGS. 2 and 3. This additional step comprises imparting a twist to the central five tube bundle 20 of FIG. 2 after heating and before the axial elongation of FIG. 3. The twisting is performed after softening a centrally located, approximately 15 mm length of bundle 20. This section is twisted by rotating one chuck relative to the other so that one end of the assembly is twisted relative to the other. Twisting in the amount of approximately 367 degrees, or 1.02 revolutions, is preferred. After the twisting step, the process continues as described above with the pulling step of FIG. 3 being next. It is to be pointed out that the twisted region is not re-heated for pulling; in other words both the twisting and the pulling are conducted in the same heating cycle. The inclusion of twist enables the five barrel tubing to behave more homogeneously at the final pulling and bumping stage.

While a preferred embodiment of the invention has been illustrated and described, it will be appreciated that principles are applioable to other embodiments.

What is claimed is:

1. The method of making a pair of multiple barrel glass micropipettes comprising:
    assembling multiple individual glass tubes into a bundle such that portions of the tubes in an axially central region of the bundle are arranged side-by-side and a central tube in the bundle is caused to have both of its opposite axial ends projecting axially beyond the remaining tubes in the bundle;
    softening the axially central region of the bundle;
    axially elongating the softened axially central region of the bundle to form a pair of axially spaced apart opposing tapers in the bundle;
    and then dividing the bundle in two at an axial location between the pair of opposing tapers to yield a pair of multiple barrel micropipettes each of which contains a corresponding one of the two tapers and each of which has the central tube projecting axially beyond the remaining tubes.

2. The method of making a pair of multiple barrel glass micropipettes comprising:
    assembling multiple individual glass tubes into a bundle such that portions of the tubes in an axially central region of the bundle are arranged side-by-side;
    softening the axially central region of the bundle;
    axially elongating the softened axially central region of the bundle to form a pair of axially spaced apart opposing tapers in the bundle;
    and then dividing the bundle in two at an axial location between the pair of opposing tapers to yield a pair of multiple barrel micropipettes each of which contains a corresponding one of the two tapers;
    including the further step of then forming in at least one of the pair of micropipettes, a bulbous shape at the one axial end thereof at which it was divided from the other, such bulbous shape being formed so as to be radially enlarged relative to an immediately contiguous portion of the micropipette.

3. The method set forth in claim 2 in which the bulbous shape is formed by relatively advancing a heating source toward said one axial end.

4. The method of making a pair of multiple barrel glass micropipettes comprising:
    assembling multiple individual glass tubes into a bundle such that portions of the tubes in an axially central region of the bundle are arranged side-by-side;
    softening the axially central region of the bundle;
    axially elongating the softened axially central region of the bundle to form a pair of axially spaced apart opposing tapers in the bundle;
    and then dividing the bundle in two at an axial location between the pair of opposing tapers to yield a pair of multiple barrel micropipettes each of which contains a corresponding one of the two tapers;
    including the further step of then relatively advancing a heating source toward the one axial end of at least one of the pair of micropipettes at which it was divided from the other to radially displace material at said one axial end in a manner that forms a shoulder via which said axial end can be gripped for pulling in a subsequent operation to size said one axial end.

5. The method set forth in claim 4 including the further step of then gripping said shoulder and conducting a sizing operation to size said one axial end while said shoulder is so gripped.

6. The method set forth in claim 5 in which the sizing operation is conducted by softening a portion of the micropipette that is immediately contiguous said shoulder and by axially elongating said immediately contiguous portion by means of an axial component of force that is exerted through said shoulder.

7. The method set forth in claim 4 in which said radially displaced material is formed into a bulbous shape that contains said shoulder, and said shoulder extends generally coaxially around said one axial end.

8. The method set forth in claim 1 in which the step of dividing the bundle in two is conducted at an axial location that is substantially equidistant from the two tapers.

9. The method set forth in claim 8 in which the dividing step is conducted by flame cutting.

10. The method set forth in claim 1 in which the elongating step is conducted so as to yield a reduced diameter portion between the two tapers that is reduced in diameter in comparison to the portions that are lying to the opposite sides of the respective tapers, and the axial location at which the dividing step is conducted is substantially at the middle of the reduced diameter portion.

11. The method set forth in claim 1 in which said bundle is fabricated by assembling multiple substantially equal length tubes, one of which is centrally disposed in the bundle, and subsequently joining a pair of additional tubes to opposite ends of the centrally disposed tube so that the centrally disposed tube and the pair of additional tubes become said central tube.

12. The method set forth in claim 11 in which one of said additional tubes is first joined to one end of the centrally disposed tube and subsequently the other additional tube is joined to the other end of the centrally disposed tube.

13. The method set forth in claim 1 including the step of twisting the softened axially central region of the bundle after the softening step and before the elongating step.

14. The at least one mioropipette made by the method of claim 2.

15. The at least one micropipette made by the method of claim 3.

16. The at least one mioropipette made by the method of claim 4.

17. The at least one micropipette made by the method of claim 5.

18. The at least one micropipette made by the method of claim 6.

19. The at least one micropipette made by the method of claim 7.

20. The method set forth in claim 2 including the step of twisting the softened axially central region of the bundle after the softening step and before the elongating step.

21. The method set forth in claim 4 including the step of twisting the softened axially central region of the bundle after the softening step and before the elongating step.

22. A multiple barrel glass micropipette comprising a bundle of individual glass tubes that are arranged axially side-by-side along at least a distal end portion of the bundle and are tapered to a tip in said distal end portion which is subsequently axially drawn to a desired size and said distal end portion of said tip is endowed with a bulbous shape that is radially enlarged in comparison to an immediately proximal portion of said tip but is radially smaller than the radial dimension of the bundle as measured across the axially side-by-side arranged portion thereof immediately proximal the taper.

23. A micropipette as set forth in claim 22 in which said bulbous shaped tip is a generally spheroidal shape.

24. A micropipette as set forth in claim 23 in which the radius of the generally spheroidally shaped tip is less than twice that of the immediately proximal portion of the tip.

25. A micropipette as set forth in claim 22 in which said immediately proximal portion of said tip has a radius that is at least about five times smaller than that of said immediately proximal portion of said bundle.

26. A micropipette as set forth in claim 25 in which the radius of the generally spheroidally shaped tip is less than twice that of the immediately proximal portion of the tip.

27. A micropipette as set forth in claim 22 in which said tubes are circular in shape and axially joined together.

28. A micropipette as set forth in claim 22 in which one of said tubes is central in the bundle and other of said tubes are arranged circumferentially around said one tube, said one tube projects axially proximally beyond said other tubes.

* * * * *